United States Patent
Ashley et al.

(10) Patent No.: US 7,379,633 B1
(45) Date of Patent: *May 27, 2008

(54) METHODS FOR FABRICATION OF POLYMER INTEGRATED OPTICAL TRANSCEIVER MODULES

(75) Inventors: Paul R. Ashley, Toney, AL (US); Michael D. Bramson, Ridgecrest, CA (US); Geoffrey A. Lindsay, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/590,993

(22) Filed: Oct. 31, 2006

(51) Int. Cl.
  *G02B 6/12* (2006.01)
(52) U.S. Cl. ..................................... 385/14
(58) Field of Classification Search .................. 385/14
  See application file for complete search history.

(56) References Cited

U.S. PATENT DOCUMENTS

| | | |
|---|---|---|
| 4,286,838 A * | 9/1981 | Huignard et al. ........... 372/50.1 |
| 5,321,503 A | 6/1994 | Bramson et al. |
| 5,422,713 A | 6/1995 | Bramson |
| 7,071,268 B1 | 7/2006 | Lindsay et al. |
| 7,228,022 B1 * | 6/2007 | Bramson et al. ............. 385/14 |

* cited by examiner

*Primary Examiner*—Sarah Song
(74) *Attorney, Agent, or Firm*—Brian F. Drazich; Charlene A. Haley (57) ABSTRACT

The present invention provides methods for fabricating interferometric fiber optic transceivers having integrated components in which a polymer-on-silicon and beam splitter module replaces the conventional $LiNbO_3$ crystal. The polymer-on-silicon waveguides permit the hybridization of the transceiver and its semi-automated production by semiconductor processing equipment.

It is emphasized that this abstract is provided to comply with the rules requiring an abstract that will allow a searcher or other reader to quickly ascertain the subject matter of the technical disclosure. It is submitted with the understanding that it will not be used to interpret or limit the scope of the claims.

22 Claims, 8 Drawing Sheets

METHODS FOR FABRICATION OF POLYMER INTEGRATED OPTICAL TRANSCEIVER MODULES

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention provides methods for fabricating interferometric fiber optic transceivers having integrated components in which a polymer-on-silicon and beam splitter module replaces the conventional LiNbO$_3$ crystal. The polymer-on-silicon waveguides permit the hybridization of the transceiver and its semi-automated production by semiconductor processing equipment.

BACKGROUND OF THE INVENTION

The Interferometric Fiber Optic Gyroscope (IFOG) was first developed at Stanford University in 1981. The Stanford IFOG is more fully described in the Stanford Report No. 3586, June 1983 by Ralph Alan Bergh G. L., of Stanford, Calif. The operation of this basic IFOG follows. A light source passes light through the interferometer optics and is split into two beams that propagate in opposite directions around the fiber optic coil. After propagating around the coil, the two beams of light are recombined and produce an interference pattern the position of which, at the detector, is shifted by an amount proportional to the phase difference between the two recombined beams. The phase difference between the two oppositely propagated split light beams is proportional to the rate of rotation of the fiber optic coil.

The Stanford IFOG research demonstrated the suitability of the IFOG as a rotation sensor for navigation applications. If mass production techniques could be devised for fabricating the sensor, electronic methods employed for error compensation as well as obtaining a linear digital output, and packaging devised for overcoming environmental sensitivities, the gyroscopic sensor could be made practical. Technology developed in the 1980's addressed these issues.

To make production of a sensor faster and easier as well as to produce a sensor having greater uniformity unit-to-unit that is environmentally stable and better suited to digital electronics, a Lithium Niobate (LiNbO$_3$) crystal integrated optical chip with waveguides, couplers, and phase modulators was developed. Optical waveguides are devices that guide light waves along a path typically defined by a transparent glass or polymeric light transmitting core and a transparent cladding surrounding the core, with the cladding material generally having a lower index of refraction than the core material. The optical chip is employed between the input fiber optic coupler and the fiber optic coil of the gyroscope. The highly degenerate mode rejecting true single mode waveguide operation (highly polarizing waveguide), high modal purity, and low polarization cross talk performance of the crystal waveguides enabled navigation application optical gyroscope performance. The high modulation bandwidth and linearity possible with the LiNbO$_3$ chip enabled the use of electronic means for error compensation and generating a linear digital output. Additionally, the component planarization afforded by integrated optic fabrication eliminates some of the intercomponent misalignments which degrade performance. Finally, using the integrated optics chip reduces the parts count, the volume, and the touch labor required to manufacture the gyroscope.

Although the LiNbO$_3$ chip provides a level of integration, the gyroscope remains as an assembly of discretely packaged components wherein each gyroscope component has attached fiber optics used to communicate with other components. Furthermore, the redundant packaging of the LiNbO$_3$ chip adds bulk, cost, and electrical complication from shielding and grounding considerations.

BRIEF DESCRIPTION OF THE DRAWING

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION OF THE PRESENT INVENTION

Functional Description

Figure 8:
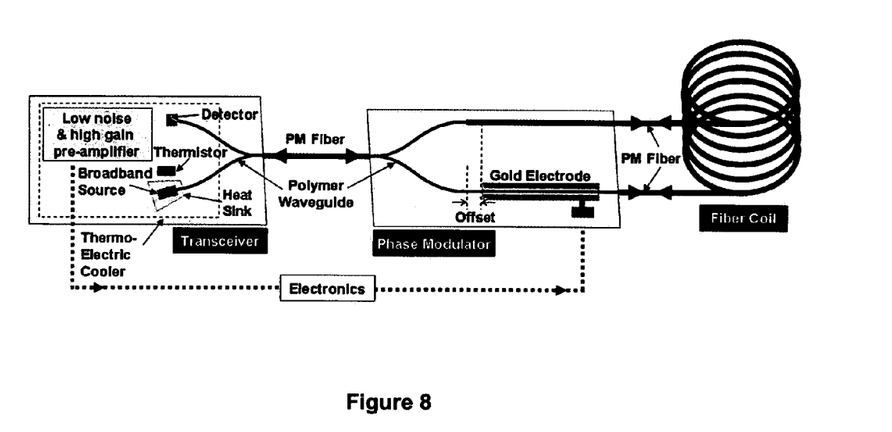
FIG. 8 is a schematic of a polymer based IFOG system showing its optical and electro-optical components.

The present invention provides fabrication and integration of a lower cost polymer integrated optic transceiver (10) for applications utilizing interferometric fiber optics including in applications such as interferometric fiber optic gyroscopes (IFOG), fiber sensing, communications and the like systems. The transceiver includes a broadband source and low-noise & high-gain detector/pre-amplifier integrated to an optical fiber via an on-board waveguide coupler with a thermal controller. FIG. 8 illustrates a schematic of a polymer based IFOG system showing its optical and electro-optical components.

The present invention relates to methods for the fabrication of an optical transceiver (10) including an optical bench (15) comprising of a waveguide (24) on a silicon substrate (14). The transceiver (10) includes a light source (22) coupled to the optical bench (15) having a system of transceiver module waveguides (24) that are incorporated into the light transmitting polymer layers of the optical bench. The waveguides (24) are formed or patterned into the optical bench utilizing a combination of specific optical waveguide polymer layers to form a waveguide coupler (26) having at least three ports: an output port (30), a detector port (29) and a light source port (28). The output port (30) is coupled to the waveguide coupler (26) and a polarization maintaining (PM) fiber (52). The PM fiber (52) propagates an optical signal into the output port (30), into the waveguide coupler (26), through the detector port (29), and into a detector (32). The detector (32) is optically coupled to the optical bench and electrically coupled to transceiver electronic circuits and functions convert optical signals into electrical signals for output and processing.

Figure 1:
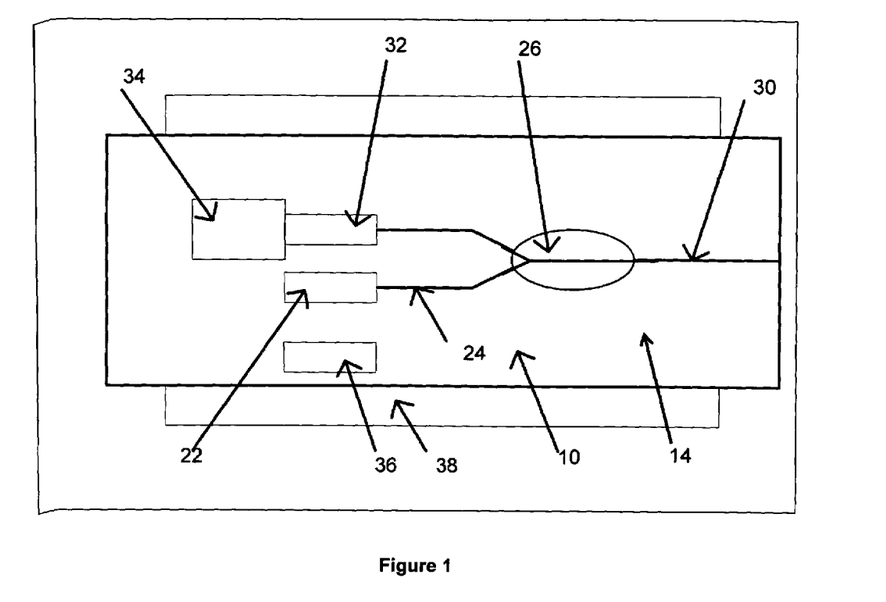
FIG. 1 is a schematic diagram for an integrated optical transceiver, according to embodiments of the invention.

FIG. 1 depicts a stylized schematic of a typical integrated optical transceiver (10) of the present invention. The unit includes a polymer on silicon substrate (14), a light source (22), a detector (32), a pre-amplifier (34), and a thermistor (36) mounted on a thermoelectric cooler (TEC) (38). The polymer on silicon substrate is termed a silicon optical bench for two reasons: First this substrate (14) is utilized as the mounting bench or optical bench on which the other components are disposed; and, secondly, the incorporation of the optical waveguides (24) which are patterned using a combination of different polymers are formed in the top layers of this bench.

In operation, a light source, such as a fiber (typically a laser pumped Erbium doped fiber) or a super luminescent diode (SLD) (22) produces light with short coherence length that is coupled into the light source port (28) of the waveguide coupler or Y junction (26). An SLD type of source (22) is preferred for an IFOG implementation. For other types of applications such as fiber sensing, communications and the like, a semiconductor laser may be the light source (22). The wavelength of operation for IFOG devices, fiber sensing, communications and the like may be any band or line width in the electromagnetic spectrum. Typically, only that portion of the spectrum from visible (~700 nm) to near infrared (~5000 nm) is of interest for such applications. However, given the ready availability and cost of suitable light sources at these wavelengths, a wavelength of about 1310 nm or about 1550 nm is preferred for most IFOG applications. The light from a source (22) is coupled into the polymer waveguides (24) and propagates to the Y junction or coupler (26) and onto the single output port (30). Signal light from the specific sensor, or fiber optic coil, returns via this output port (30) and propagates along waveguide (24) to the detector element (32) where it is detected and amplified. Signal information from the detector (32) is then output to the pre-amplifier (34) for processing and output to external devices.

Microfabrication technology using polymers allows the construction of the optical circuit components, i.e. the waveguides (24) and Y branch or power splitter or waveguide coupler (26) to be implemented on a single silicon substrate (14). For this optical circuit a silicon wafer (12) is used as the substrate for a silicon optical bench or platform for all the optical circuit components. As used herein the terms silicon optical bench, optical bench, optical chip and optical circuit chip each refer to the coated and patterned silicon substrate (14) together with the polymeric lower cladding layer (16), core layer (18), waveguide (24), optical coupler or power splitter (26), waveguide ports (28, 29, 30), upper cladding layer (20), and the other optical circuit components mounted thereon and is designated by reference character 15.

After determining the size of the individual components required for a particular application, the layout and configuration of components is generated for the transceiver (10). The transceiver optical circuit chip (15) provides areas or pads on the silicon substrate for mounting a pre-amplifier (34), an SLD light source (22), a detector element (32), a thermistor (36), a heatpipe or heatsink (40), and other components such as wire bonding pads and electrical circuit traces and grounding planes. This optical transceiver (10) is then mounted into a housing (54) package, which may be constructed of any material having the mechanical strength and rigidity, and the heat conducting and electrical properties necessary for efficient operation of the optical transceiver (10). Affixed in the housing (54) and in operational mechanical, thermal and electrical contact with the optical circuit chip (15) is a thermoelectric cooler (TEC) (38). Electrical power and data transmission to and from the optical transceiver (10) is provided by a standard telecommunications industry connection. The preferred pinout pattern for this connector package is a standard 14 pin dual in line pattern used in the telecommunications industry.

Figure 2:
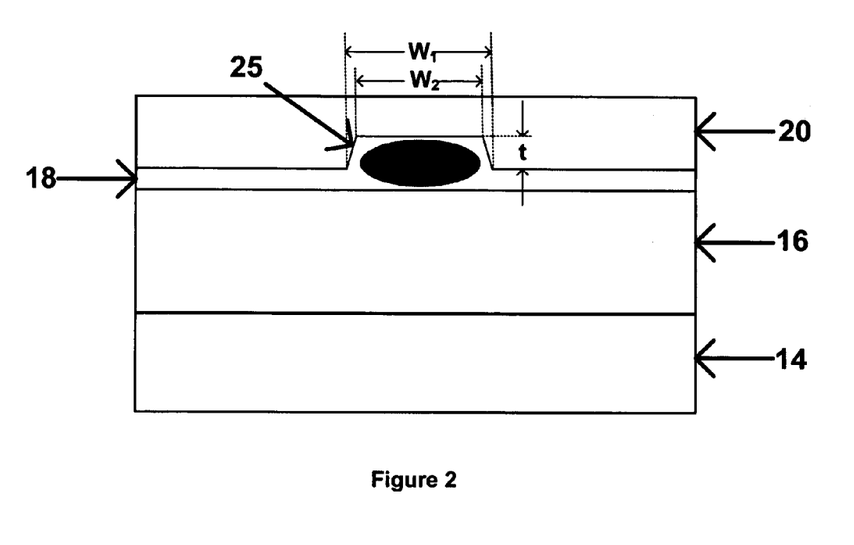
FIG. 2 is a schematic cross section of one embodiment of the transceiver polymer waveguide.

The transceiver module (10) waveguide (24) structure is comprised of a silicon nitride coated gold patterned silicon substrate (14), a first polymeric layer or lower cladding (16), a second polymeric layer or core (18), and a third polymeric layer or upper cladding (20). The core (18) is mechanically and optically coupled to both the upper cladding (20) and the lower cladding (16). Light transmitting optical channels or waveguides (24) are formed in the core (18). The lower cladding (16) is mechanically and optically coupled to the silicon substrate (14). The lower cladding (16), upper cladding (20), and core (18) polymer films each possess both an ordinary index of refraction, nTE, for propagation of the transverse-electric (TE) mode of transmitted light and an extraordinary index of refraction, nTM, for propagation of the transverse-magnetic (TM) mode of transmitted light. The lower cladding (16) has an extraordinary index of refraction of $ne_L$ and an ordinary index of refraction of $no_L$, the core (18) has an extraordinary index of refraction of $ne_C$ and an ordinary index of refraction of $no_C$, the upper cladding (20) has an extraordinary index of refraction of $ne_U$ and an ordinary index of refraction of $no_U$.

Typically, TE polarizing waveguides are needed for IFOG transceivers to achieve efficient power coupling and light propagation because the SLDs used as the light source are generally TE polarized. In a transverse-electric (TE) mode transceiver module waveguide (24) the core (18) and cladding materials (16, 20) are selected to have the following index profile. The extraordinary indexes of refraction are chosen to be $ne_L > ne_C > ne_U$, and the ordinary indexes of refraction are chosen to be $no_L < no_C > no_U$. This selection of indexes of refraction is accomplished by using a birefringent core (18) material together with a non-birefringent (or low-birefringent) lower cladding material (16). This configuration of layers yields a polarization state of the optical mode that is transverse-electric (TE). The extinction of the unwanted transverse-magnetic (TM) non-degenerate single optical mode is greater than 55 dB, while the non-degenerate single optical TE mode of light entering the waveguide (24) from the light source (22) is attenuated less than 3 dB per centimeter of length of waveguide.

For a transverse-magnetic (TM) mode transceiver module waveguide (24) the core (18) and cladding materials (16, 20) have the following index profile. The ordinary indexes of refraction are chosen to be $no_L > no_C < no_U$, and the extraordinary indexes of refraction are chosen to be $ne_L < ne_C > ne_U$. This selection of indexes of refraction is accomplished by using a non-birefringent (or low-birefringent) core (18) material with a birefringent lower cladding material (16). This configuration of layers yields a polarization state of the optical mode that is transverse-magnetic (TM) when coupled to a TM light source. The extinction of the unwanted transverse-electric (TE) non-degenerate single optical mode is greater than 55 dB, while the non-degenerate single optical TM mode of light entering the waveguide (24) from the light source (22) is attenuated less than 3 dB per centimeter of length of waveguide.

In a non-polarized transceiver module waveguide (24) the core (18) and cladding materials (16, 20) are selected to have the following index profile. The indexes of refraction are chosen to be $n_L < n_C > n_U$. This selection of indexes of refraction is accomplished by using non-birefringent (or low-birefringent) core and cladding material.

Several integration issues including optical crosstalk, optical isolation, mechanical stability, thermal management, and electrical crosstalk are addressed by the present invention. As used herein optical crosstalk describes the unwanted background light incident on the detector. This is suppressed with absorption materials and proper placement of components to minimize the direct path for light scattering. Optical isolation techniques further minimize or prevent light from reflecting from the chip optical facets at angles favorable for coupling back into waveguides (24). Unwanted reflected or scattered light manifests itself as background noise and reduces the system rotation signal dynamic range. Angle cuts and angle polishes for these coupling interfaces significantly reduce such extraneous reflected light and the resultant background noise. The amount of unwanted background light reaching the detector was reduced to less than 100 nW by using absorptive materials as well as by etched channels or baffles in the polymer waveguides and the substrate.

Mechanical stability in the placement of the components is required to maintain stable coupling of the light from one component to another. A proper choice of the physical properties of substrate materials and appropriate thicknesses provides the best means for maintaining mechanical stability.

Thermal management is a key to preventing the light source (22) from drifting in wavelength and power. Wavelength drift can manifest itself as scale factor error, phase noise, and/or intensity fluctuations at the output signal detection plane. Electrical crosstalk can be generated from outside sources and from modular electronics that can interfere with signal integrity resulting in reduced system sensitivity.

It will be clear from the description herein and the appended claims that the present invention provides a unique method for fabricating an optical transceiver module (10) that combines a polymer on silicon technology with new and novel methods of integration of the components to complete its manufacture. The benefits include lower cost of production as well as reduced size and mass due to wafer scale fabrication of the silicon optical bench together with enhanced gyroscope performance compared with conventional fabrication techniques.

Fabrication of the Polymer Layers of the Optical Bench

Fabrication of the transceiver substrates and components use standard microfabrication processes and equipment wherever possible. A typical sequence of the major or key steps in the fabrication of waveguides (24) in the transceiver silicon optical bench (15) is as described in what follows. It will be understood by one of ordinary skill in the present art that the means for coating, patterning and/or etching may be varied and that such methods and their constructs are within the scope of the present invention.

(1) Gold is sputter coated onto a silicon nitride (SiN) coated 4" double-side polished silicon wafer (12) typically having a resistivity of about 4-6 ohm-cm and orientation: <1-0-0>.

(2) The gold coating is patterned with electrical traces and wire bond pads by conventional microfabrication masking and etching techniques. The silicon nitride provides the isolation for these electrical traces and wirebond connections.

(3) A first polymeric layer or lower cladding layer (16), of about 2.5 μm to 3.5 μm thickness, of a polymer having a first selected birefringence, is deposited on the patterned gold preferably by spin casting or spin coating and baked at temperatures from 100° C. to 350° C. for about 70 minutes. For guiding the TE mode, a low birefringent polymer such as Dupont polyimide 2525 or a similar polymer having low birefringence is suitable. As used herein, the terms "deposit", "deposited", and "depositing" when used in relation to a polymeric layer and another different polymeric layer, or a silicon substrate, shall be understood to mean that said polymeric layer and said silicon substrate or other polymeric layer are mechanically and optically coupled.

(4) A second polymeric layer or core layer (18), about 3 μm in thickness, of a preferably amorphous polymer having a second selected birefringence is preferably spin cast, or otherwise deposited, on the lower cladding (16) and baked at temperatures from 100° C. to 280° C. for about 50 minutes. The core material may be a chromophoric material in which the chromophore is chemically attached to the polymer or to a solubilizing group, or may be of the guest-host type. For guiding the TE mode, a high birefringent polymer such as Dupont polyimide 5878 or a similar polymer having high birefringence is suitable. In addition, a process for making highly birefringent polyimide core and cladding materials is disclosed in U.S. Pat. No. 7,071,268 which is incorporated by reference herein as though set forth at length.

(5) Photolithography is performed on the core layer (18) to pattern it with the desired waveguide width and the layout or path along which light is to be guided. In this process, a pattern of photoresist is coated on the core layer (18) which is then exposed to ultra violet (UV) radiation—except in the photoresist protected region where the rib waveguide (25) is to be formed. Typically the width of the rib (25) varies from about 4.0 μm at the top of the layer to about 7.5 μm at the bottom of the layer. The cross-sectional geometry of the rib waveguide (25) is optimized for the wavelength of light to be guided (typically 1310 nm or 1550 nm). The primary parameters of the rib waveguide (25) are rib width, rib height, and core thickness. The optimal values for the 1310 nm wavelength rib waveguide (25) are rib top width ($w_1$) of about 4.0 μm, rib bottom width ($w_2$) of about 7.0 μm, and rib height (t) of about 1.25 μm, and the optimal values for the 1550 nm wavelength rib waveguide (25) are rib top width ($w_1$) of about 4.5 μm, rib bottom width ($w_2$) of about 7.5 μm, and rib height (t) of about 1.50 μm.

(6) Next, the core layer (18) in the UV exposed region is etched with reactive ion etching (RIE) to the designed depth of the waveguide rib height, typically about 1.25 μm or about 1.5 μm.

(7) A third polymeric layer or upper cladding layer (20), about 2.5 μm to 3.5 μm in thickness, of a polymer having a third selected birefringence is deposited on the core layer (18). For example, a commercially available low birefringent polymer such as Norland-71 (NOA-71) is suitable for the upper cladding layer for guiding TE mode. The resulting polymer stack was baked at 148° C. for 15 minutes under a nitrogen atmosphere.

It will be understood by one skilled in the art that the steps for fabrication of waveguides (24) for guiding TM mode or guiding non-polarized mode are the same as described above for guiding TE mode, except that the core material and cladding materials will differ in the indexes of refraction and birefringence selected as has been previously described.

Figure 9:
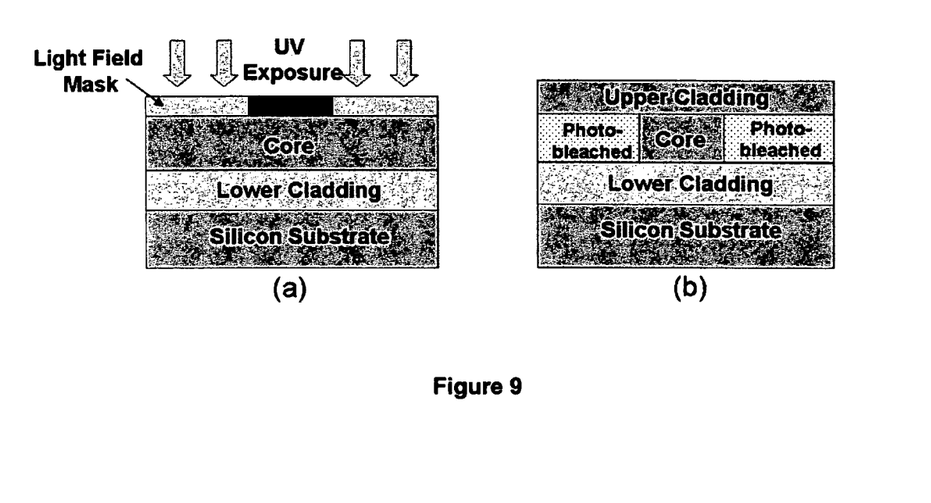
FIG. 9 depicts the waveguide photobleaching process (a) and the cross section of a photobleached waveguide (b).

Alternatively, a photobleaching technique may also be used in fabricating TM mode polarized waveguides. In this process, the chromophore in the waveguide region is protected from exposure by a mask as has been described. The bleaching is extended through the entire thickness of the core layer producing rectangular waveguide geometry. The photobleaching forms waveguide channels by inducing an index change in the exposed core material, thereby eliminating the need for etching processes to form the waveguide. For photobleached formed waveguides, the waveguide width is determined by the photobleaching time and the width of the waveguide mask while the waveguide height is selected by varying the core thickness. About eight exposures of 15-minute duration (2 hours total) with 3-minute interrupts between the exposures were sufficient to bleach an entire wafer. FIG. 9 depicts the photobleaching process (a) and the cross section of a photobleached waveguide (b).

Further subtractive patterning of the polymer layer stack is necessary to form coupling facets and device mounting areas on the chip (15). To complete the patterning processes, the etching techniques used are performed in reactive ion etchers. Both the charge/capacitively coupled plasma (CCP) and inductively coupled plasma (ICP) processes are used for etching the polymer stack. The major or key steps in etching the polymer stack to produce coupling facets and device mounting areas are: (1) The wafer (12) containing one or more optical benches or optical chips (15) is sputter coated with a layer of silicon dioxide ($SiO_2$) about 0.12 µm thick over the entire surface of the upper cladding layer (20); (2) Photoresist is spun on over the silicon dioxide layer and patterned for the features where the polymer stack is to be totally removed. These areas where the polymer layers have been removed are used for wire bond pads and for mounting the pre-amplifier (34), detector (32), light source/heatpipe subassembly (22, 40), and a thermistor (36). The photoresist allows the patterning of the silicon dioxide beneath it which in turn serves as a hard etch mask for the polymer layer stack; and, (3) The 3-layer polymer stacks preferably are etched in an ICP system under the following conditions: coil power RF 500 W, substrate power RF 300 W, 30 sccm $O_2$, 3 sccm $CF_4$, and a chamber pressure of 5 mT. The addition of the $CF_4$ to the process gas mixture is required to remove residual constituents of the upper cladding polymer which do not easily etch in $O_2$. The average etch rate is 1.4 µm/min with minimal undercutting and with no surface damage present. The etch uniformity variation is ~3% across a 4-inch wafer substrate. Steps taken to minimize heating of the sample include cooling the sample chuck via recirculating chilled water held at 5° C., and helium backside cooling of the wafer substrates. The etched samples are characterized via optical microscopy and scanning electron microscopy (SEM). The process yields a smooth facet in the core layer that helps to reduce backscattering of light.

Fabrication processes for waveguide facet formation at the ports (28, 29, 30) use inductively coupled deep reactive ion etching (DRIE). The process yields a smooth facet in the core layer (18) that helps to reduce backscattering of light. The DRIE process is also used to etch other polymer and silicon reliefs in the substrate (14) such as the about 180 µm to about 250 µm deep well or cavity for mounting of the detector.

Figure 7:
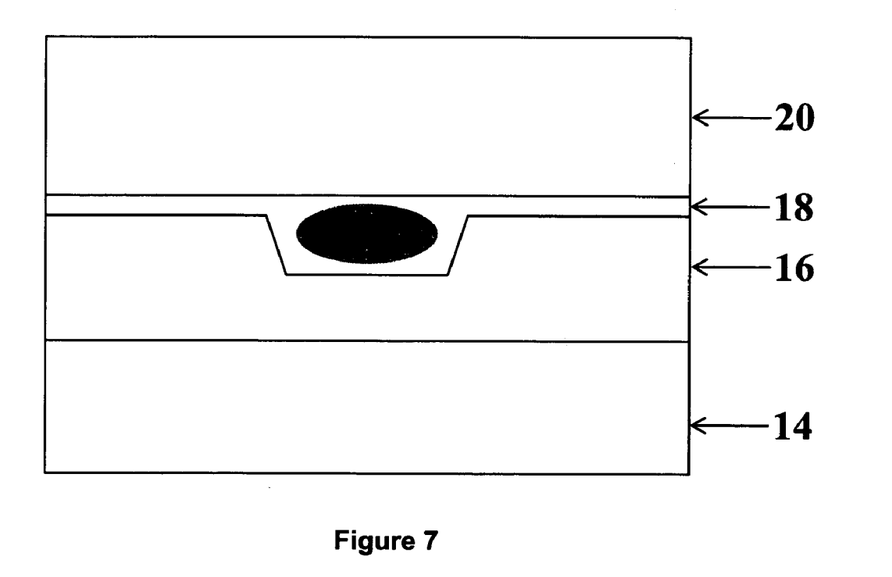
FIG. 7 is a schematic diagram of a waveguide fabricated in the form of a trench.

Alternatively, these techniques may be applied to construct waveguides having a trench-like structure and cross-section rather than the rib structure and cross-section described above. For guiding the TE mode, a low-birefringent lower cladding layer (16) is deposited on the silicon substrate (14). A trench of designed width and depth is formed in the lower cladding layer (16) using the masking and etching techniques discussed elsewhere herein for fabrication of waveguides. For guiding light of 1310 nm and 1550 nm wavelengths, respectively, the width and depth of the trench are the same as the width and height of the rib structure waveguide discussed above. A core layer (18) is then deposited on the lower layer (16), filling the trench feature. Finally, an upper cladding layer (20) is deposited on the core layer (18).

Device Fabrication and Integration

Figure 3:
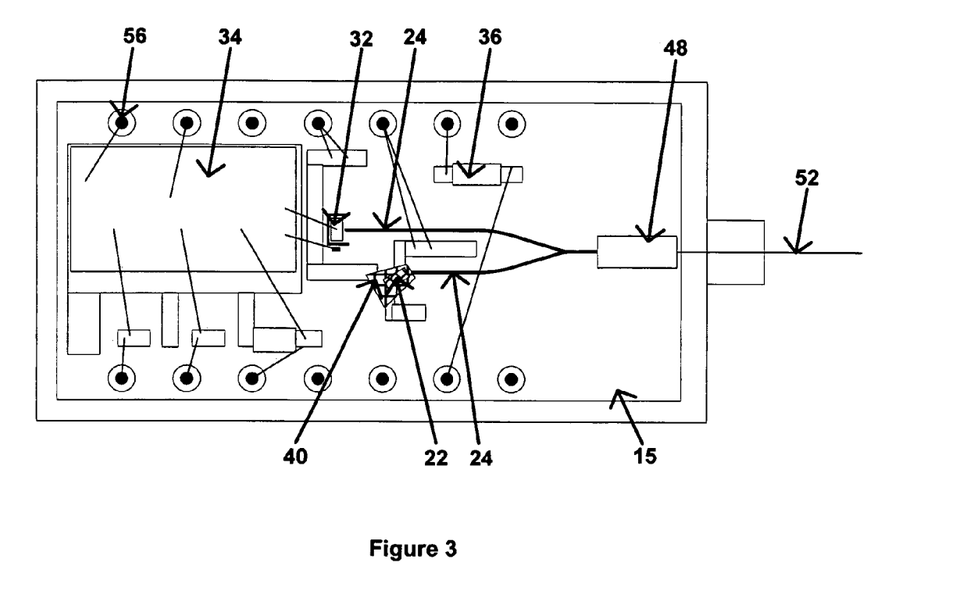
FIG. 3 is a schematic diagram showing the integration of components on the silicon substrate, according to embodiments of the invention.

Following separation from the wafer (12) the transceiver substrate (14) containing the polymer layer stack, the various components of the transceiver (10) are integrated onto the optical bench (15) to complete the transceiver (10). FIG. 3 shows the locations where the SLD (22), the detector (32), and the fiber pigtail (48) are integrated with the waveguides (24).

Preferably the first component to be installed on the optical bench is the SLD (22). For use as an IFOG transceiver, preferably SLDs are chosen as the system light source (22) for their small size and power available. Virtually all versions of SLDs fabricated today utilize the angle stripe design for optical isolation. Other suitable light sources (22) for the transceiver (10) include sources providing sufficient intensity such as a laser diode or a laser pumped fiber light source, for example. All the light sources (22) mentioned are capable of several tens of milliwatts of light output at desired wavelengths.

To produce the transceiver (10) in a more automated fashion for production manufacturing, an automated pick and placement machine was setup for the placement and installation of the SLD onto the waveguide substrate (14). The principal components of a pick and placement machine includes a set of stages moveable in the X-Y plane mounted onto a granite base, a rotatable upper fixture movable as well in the Z direction for picking up and orienting the die to be placed, and cameras for viewing the components and their placement. Overall the pick and placement machine has six degrees of freedom of movement, including two in-plane tilts, X, Y, Z translation and rotation about the Z axis. The pick and place upper fixture is outfitted with different tools and chucks adapted for the different dies it is used to handle and place. The upper fixture also includes a heater for curing epoxy or melting solder. The bottom stages also have heaters incorporated in them for the same purpose. Cameras are used in conjunction with a computer operated control system adapted to use the image data to pick up components from storage packs and to perform the course automatic alignment for placement. Manual control of stage movement for fine alignment allows placement of the SLD (22) onto the substrate (14) with the precision required.

The integration process begins with the placement of attachment epoxy onto the substrate (14) at the location where the SLD is to be placed. This epoxy is electrically conductive to complete the electrical circuit for powering the light source (22). A preferred pattern of the epoxy is an array of two rows droplets, one row on either side of where the SLD's active waveguide will be located. Other methods of attachment can be used, such as, solder or a bump bonding method such as with indium, and the like. The SLD (22) is placed with its anode side facing and against the substrate (14). After the conductive epoxy is applied, the substrate (14) is placed onto the pick and place machine's chuck. The chuck typically is made of Kovar machined with a small depression with two angled edges for substrate registration. The angle orientation of the substrate (14) allows the SLD to be aligned with the table X,Y axes. This initial alignment facilitates the small movements necessary to align the SLD (22) to the waveguide (24). By aligning the SLD to the Y-axis, moving the SLD closer to the waveguide (24) facet requires only a movement in the table Y axis and not a coupled movement of both the X and Y table movements. The upper fixture holds the light source (22) SLD die, and lowers it onto the substrate (14) held by the chuck. The SLD is positioned on the substrate (14) at a predetermined angle to the waveguide (24) selected to facilitate optical isolation. Before the SLD die is picked up, the initial planarity of the chuck is established during a calibration mode that sets the two in-plane tilts to be the same as that of the substrate (14). The remaining four degrees of freedom (x, y, z translation and rotation about the z axis) are then used to align the SLD (22) for coupling to the polymer waveguide (24).

An optical feedback system is employed to assist in the final alignment of the SLD. An electrical potential is applied on the upper fixture arm of the pick and place machine which holds the SLD. Upon lowering the SLD (22) onto the waveguide substrate (14), the SLD contacts uncured conductive epoxy which completes the circuit for powering and illuminating the SLD. With XY stage and upper fixture movement used to orient and position the SLD in proximity to the waveguide (24) facet, and with the SLD (22) being powered up upon contact with the uncured conductive epoxy, sufficient SLD-to-waveguide coupling is obtained to generate an optical output at the substrate exit port (30). This exit port (30) is the termination of the waveguide (24) on the edge of the substrate (14). Light intensity from the waveguide exit port (30) is imaged and its intensity is monitored, such as with a radiometer. SLD position is then adjusted until maximum intensity, indicative of optimum SLD to silicon optical bench substrate coupling alignment, is obtained. This alignment is maintained and the epoxy curing heaters are turned on to affix the SLD in place. Then, to monitor the temperature of the SLD, a surface mount 10K thermistor (36) is attached to the substrate with conductive epoxy in close proximity to the SLD (22).

Following mounting of the SLD, conductive epoxy is placed on the upward facing cathode side of the SLD (22) and additional conductive epoxy is deposited on the substrate adjacent to the not light-emitting rear end of the SLD. A copper heatpipe or heatsink (40) is then affixed to both the cathode side of the light source (22) and to the substrate (14) by the conductive epoxy. The heatsink or heatpipe (40) is especially designed to optimize the conduction of heat from the SLD (22) into the substrate (14). Preferably, the heatsink or heatpipe is about 2.0 mm tall and is fabricated from oxygen free high conductivity copper. The heatpipe or heatsink (40) also provides electrical connection between the SLD (22) and the silicon optical bench (15). Utilizing this arrangement, optical power as high as 1.5 mW was obtained at the current of 300 mA and the temperature of 20° C. in pigtailed devices.

A preassembled electronic pre-amplifier (34) subassembly is affixed, preferably by epoxy, to the substrate (14) at a predetermined designated location, preferably adjacent the location of the detector (32), as shown for example in FIGS. 1 and 3.

Figure 4:
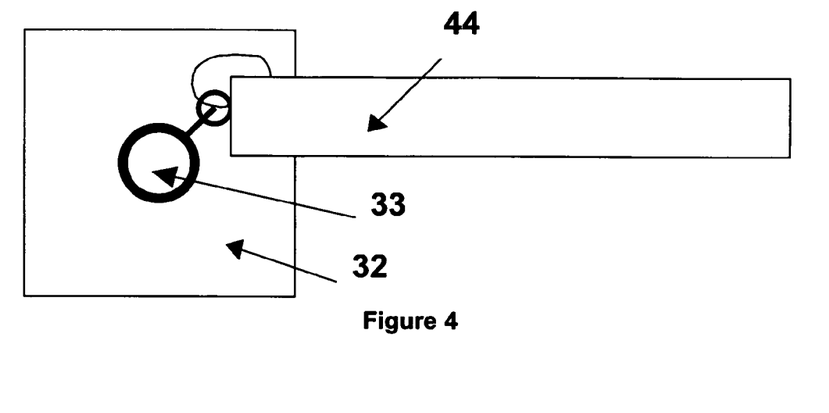
FIG. 4 is a schematic diagram showing attachment of the detector on the handle.

The detector (32), preferably an InGaAs photodiode having about a 75 micron diameter active area (33), is mounted on the substrate (14) with its active area parallel to the waveguide facet. FIG. 4 depicts the detector (32) attached to a handle (44) preferably made of alumina. The handle (44) affords ease of handling and provides for depth regulation of the detector (32) when it is positioned in the about 250 µm deep well or cavity that has been etched through the polymer layer stack and into the silicon substrate (14). The detector (32) is affixed, preferably by epoxy, to the handle (44) which itself is affixed, preferably by epoxy, to the silicon optical bench (15). Gold traces are patterned on the handle for wire bond connections to the pre-amplifier (34).

Figure 5:
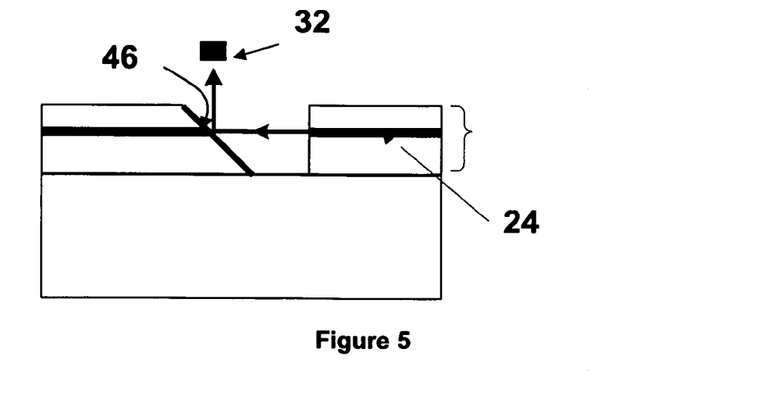
FIG. 5 is a schematic diagram showing an alternative placement of the detector of a second embodiment of the invention.
Figure 6:
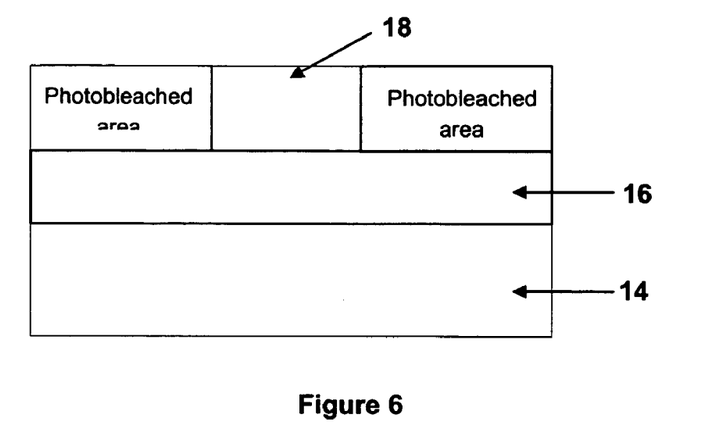
FIG. 6 is a schematic diagram of the cross section of a photobleached waveguide before the upper cladding was fabricated.

With reference to FIG. 5, an alternate method of detector placement is shown. In an alternate method the detector may be affixed, preferably by epoxy, to the top surface of the silicon optical bench (15). A 45 degree mirror (46) is patterned and metalized in the polymer layer stack to reflect a portion of the light exiting the waveguide (24) to the detector (32).

An optical polarization maintaining (PM) fiber pigtail (48) is then attached near one end of the silicon optical bench (15). This is accomplished by means of a ferruled optical fiber that is preferably epoxied in place near one edge of the optical bench or optical circuit chip (15) after alignment with the waveguide (24) end face or output port (30). The waveguide end face or output port and the fiber end face are cut at specified angles calculated to minimize back reflection from the interface.

The polarization maintaining fiber (52) is rotationally aligned to the waveguide end face or output port (30) using a white light interferometer technique. The process and technique used for precise rotational alignment of the fiber with the waveguide end face is described in detail in U.S. Pat. No. 5,422,713, issued Jun. 6, 1995, incorporated herein by reference. This procedure is briefly described as follows. The bare end of the fiber is placed into a precision fiber rotator while the ferruled end is placed in a spectrum analyzer equipped with a white light interferometer. Light from a SLD is coupled into the bare end of the fiber with the aid of a pair of microscope objectives, preferably 20×, and a polarizer. In the analyzer, the light passes through another microscope objective, preferably 10×, a polarizer acting as an analyzer, and another 10× microscope objective. The light is coupled into a 90/10 fiber coupler whose 90% arm is the input for the spectrum analyzer. The ferruled end of the PM fiber is rotated while the output of the analyzer is monitored, thus aligning the fiber. The 10% arm of the coupler is use to monitor the optical power using a detector connected to a power meter. While monitoring the coherence spectrum using a spectrum analyzer, the bare end of the fiber is rotated until the desired correlations peaks are seen. This aligns the proper axis of the polarization maintaining fiber (52) to the light source (22). Since this step does not require the chip, the full amount of power can be used. After the rotation is set, the ferruled end of the pigtail (48) is placed in the detector (32) so that the power out of the pigtail can be set to power level low enough to protect the chip (15) from any photodegredation. The ferruled end of the pigtail (48) is butted up to the optical chip (15). Light is coupled through the waveguides (24). Since the light source (22) and the modulator module of the IFOG have opposite polarizations, the waveguides (24) act like a filter. The proper alignment is reached by rotating the ferrule until a minimum is reached.

The normal fiber pigtailing process for the optical benches or polymer chips used in optical phase modulators and optical transceivers requires the precision fabrication of fiber pigtail terminal parts and a tedious active rotational alignment process. In another embodiment of the method of the present invention a simple "self-alignment" and attachment method is used that requires only the normal optical fiber angle polish. This new method eliminates the requirement for precision fabrication of fiber pigtail terminal parts and tedious active rotational alignment. The steps in this new method are as follows.

The fiber is angled polished to the angle needed to minimize the back-reflections. A conventional fiber polishing method that uses a glass ferrule is employed. A round glass ferrule is temporarily attached to the optical fiber using a thermal bonding compound, such as Crystal Bond, which can be removed by reheating or with a solvent such as acetone. Once the ferrule is in place, the alignment and polishing process proceed. After the polishing is complete, the optical fiber is carefully removed from the ferrule. The fiber is then cleaned thoroughly in acetone and isopropyl in an ultrasonic cleaner. The polished fiber is ready to be attached and aligned to a previously fabricated about 5×5× 0.5 mm silicon handle having a groove for positioning a fiber having a core size or diameter of about 80 micron or about 125 micron.

A polarization maintaining fiber is then precision aligned rotationally to the polarization axis of the fiber using a white light interferometer technique—(U.S. Pat. No. 5,422,713). The rotational alignment is performed with the aid of a surrogate chip which is placed on a common vacuum chuck with the silicon handle to insure the planes of the chip and handle are parallel. The fiber is then positioned in the groove in the handle and a white light interferometer is used to do the rotational alignment by monitoring the coherence spectrum of the output. When the alignment is complete, the preferred polarization axis of the fiber is then adequately aligned with the surface of the handle. The fiber is then secured in the groove of the handle with the reference flat of the silicon substrate aligned. The polymer optical bench (15) is constructed with a channel etched through the polymer stack of upper cladding, core, and lower cladding and into the silicon substrate (14). The polymer channel is lithographically aligned to the waveguide (24) output port (30) with the channel width chosen to provide a tight fit to a fiber having a diameter of 80 or 125 micron. The silicon substrate (14) is etched with $SF_6$ using an inductively coupled plasma deep reactive ion etching process. The etch depth is designed to position and retain the optical fiber (80 micron or 125 micron diameter) at the proper height for alignment and optical coupling to the waveguide (24). Such a previously prepared optical fiber with aligned handle may be easily registered with a polymer chip (15) by way of the polymer alignment channel for lateral placement and then rotationally oriented by adjusting the coincidence of an optical reflection from the surface of the chip and the fiber handle.

Other methods of fiber attachment, all of which are know to those having ordinary skill in the art may also be utilized, such as, adhesives, solder, silicon grooves, or using a polymer layer to affix the fiber in place, for example.

A housing (54), preferably formed from a metal or metal alloy, such as brass, or from Kovar or a polymeric material contains the integrated transceiver and provides for electrical connection to the transceiver preferably via a standard telecommunications industry 14 pin connector. A thermoelectric cooler unit (TEC) (38), preferably capable of at least 8W of cooling, is affixed within the housing. The thermoelectric cooler, in turn, supports the silicon optical bench (15) within the housing (54). The TEC, attached to the housing, permits the silicon optical bench to be affixed to it without the need for additional mechanical support. The silicon optical bench (15) may be manually mounted on the TEC (38) attached to the housing (54) as no critical alignment required. Preferably diamond-filled thermally conducting, low modulus room temperature vulcanizable (RTV) adhesive is used to affix the silicon optical bench (15) to the TEC (38) for mechanical compliance. A diamond powder formulation containing diamond powder in a liquid polybutadiene/IPDI matrix may readily be prepared as follows.

Dry the diamond powder (high impact strength, 1-to 2-micron diameter from Warren Diamond Company of Olyphant, Pa. (570 383-3261) in a vacuum oven at 105° C. for at least 2 hours. Mix 3 parts of liquid R45M (hydroxyl-terminated polybutadiene, from Elf Atochem, Philadelphia, Pa.; Phone: 800-328-2811) to 2 parts of diamond powder (40% by weight) and stir for 3 minutes. When desired to be used, add the curative, IPDI (isophorone diisocyanate, from Aldrich Chemical). The amount of IPDI required is 6.5% of the mixed weight of R45M+diamond powder (0.065 g IPDI per 1 g of R45M/diamond mixture). Stir at 50° C. till the viscosity is manageable then place in a vacuum oven at 50° C. for 2 minutes to remove bubbles. Apply the adhesive to the part to be bonded. Cure for 1 hour at 60° C., 1 hour at 100° C. and 2 hours at 130° C. in air. Once the epoxies and RTVs are cured, the connections between the pins (56) and the traces are wirebonded.

Figure 10A:
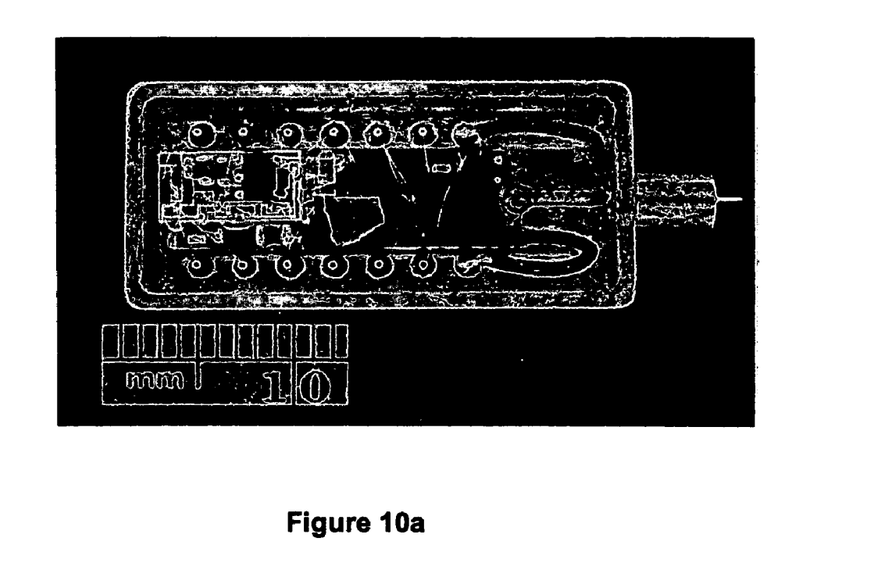
FIG. 10 depicts a completed transceiver.
Figure 10B:
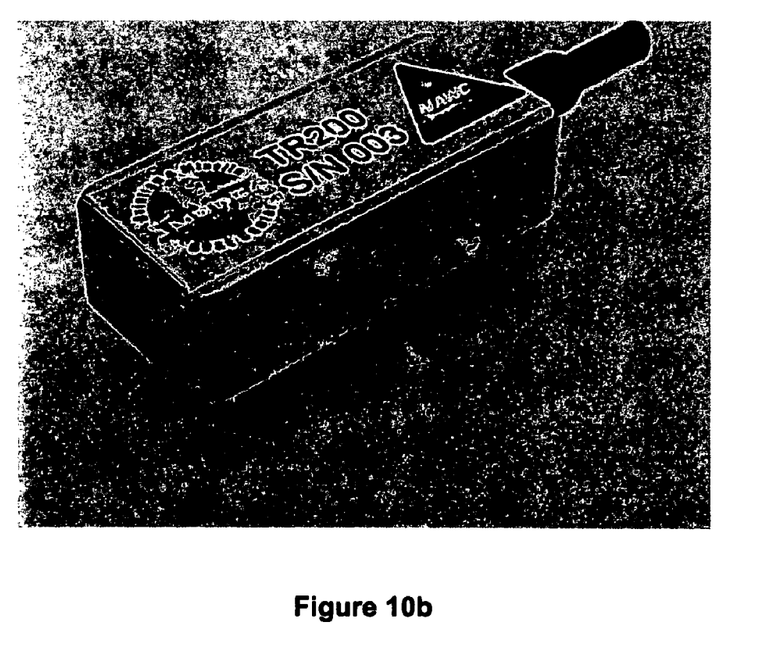

A housing lid (55) is affixed, permanently or removably, to the housing (54) by means which provide a gas tight seal, such as with epoxy, other adhesives, fasteners or solder, for example. The housing and housing lid are sealingly joined together in a nitrogen atmosphere after being immersed in a nitrogen atmosphere for sufficient time to purge oxygen from the apparatus. A completed transceiver (10) is depicted in FIGS. 10a and 10b. The output fiber (52) is preferably an 80 micron diameter PM fiber having a Teflon jacket. For most applications, the housing package exterior dimensions preferably will not exceed about 28 mm by about 12.5 mm by about 7 mm.

While the present invention has been described in connection with what are presently considered to be the most practical and preferred embodiments, it is to be understood that the invention is not to be limited to the disclosed embodiments, but to the contrary, is intended to cover various modifications, embodiments, and equivalent processes included within the spirit of the invention as may be suggested by the teachings herein, which are set forth in the appended claims, and which scope is to be accorded the broadest interpretation so as to encompass all such modifications, embodiments, and equivalent processes.

What is claimed is:

1. A method for fabricating an interferometric fiber optic transceiver comprising:
   providing a silicon nitride coated silicon wafer having a wafer upper surface patterned with gold electrical circuit elements and an opposite wafer lower surface;
   depositing a first polymeric layer having an ordinary index of refraction $no_L$ and an extraordinary index of refraction $ne_L$ on said wafer upper surface;
   depositing a second polymeric layer having an ordinary index of refraction $no_C$ and an extraordinary index of refraction $ne_C$ on said first polymeric layer;
   masking and reactive ion etching the second polymeric layer to form at least one Y branch waveguide having a light source port, a detector port, and an output port;
   depositing a third polymeric layer having an ordinary index of refraction $no_U$ and an extraordinary index of refraction $ne_U$ on the etched second polymeric layer;
   masking and removing, by an inductively coupled plasma process, selected areas of the third polymeric layer, the second polymeric layer and the first polymeric layer to expose selected electrical circuit elements on said wafer upper surface to form at least one optical bench having a portion of said wafer upper surface patterned with at least one complete gold electrical circuit element, said first polymeric layer, said second polymeric layer having a Y branch waveguide with a light source port, a detector port, and an output port, said third polymeric layer, and a portion of said opposite wafer lower surface;

dicing said at least one optical bench from said silicon wafer;

electrically coupling a light source to said optical bench;

aligning the light source on said optical bench to provide optical coupling with said light source port;

affixing said aligned light source to said optical bench;

affixing and electrically coupling a thermistor to said optical bench;

affixing and thermally and electrically coupling a heatpipe both to said light source and to said optical bench;

affixing a preamplifier to said optical bench;

disposing and aligning a detector on said optical bench to provide optical coupling with said detector port;

affixing the aligned detector to said optical bench;

electrically coupling said detector with said preamplifier;

affixing to said optical bench an optical polarization maintaining output fiber optically coupled with said output port and rotationally aligned with the polarization of said waveguide at said output port;

mechanically and thermally coupling a thermoelectric cooler to said optical bench;

electrically coupling each of the thermoelectric cooler, light source, thermistor, heatpipe, and preamplifier, to electrical connectors to provide for data transmission and electrical power.

2. A method for fabricating an interferometric fiber optic transceiver comprising:

providing a silicon substrate having an upper surface and an opposite lower surface each coated with silicon nitride and having a gold coating patterned with desired electrical circuit traces and wire bond pads on the silicon nitride coated upper surface;

depositing on said upper surface of the silicon substrate a first polymeric layer having an ordinary index of refraction $no_L$ and an extraordinary index of refraction $ne_L$;

depositing on said first polymeric layer a second polymeric layer having an ordinary index of refraction $no_C$ and an extraordinary index of refraction $ne_C$;

patterning a Y branch waveguide into a first photoresist coating disposed on said second polymeric layer;

exposing to ultraviolet light said second polymeric layer having the patterned first photoresist coating;

etching said second polymeric layer with reactive ion etching to form an etched second polymeric layer having a Y branch waveguide including a light source port, a detector port, and an output port;

depositing on the etched second polymeric layer a third polymeric layer having an ordinary index of refraction $no_U$ and an extraordinary index of refraction $ne_U$;

coating said third polymeric layer with silicon dioxide;

patterning into a second photoresist coating disposed on said silicon dioxide coating a configuration of features where said third polymeric layer, said second polymeric layer and said first polymeric layer are to be removed;

forming on said third polymeric layer a silicon dioxide etch mask of the features patterned into the second photoresist coating;

removing by an inductively coupled plasma process the third polymeric layer, the second polymeric layer and the first polymeric layer where not protected by the silicon dioxide etch mask to expose selected electrical traces and wire bond pads and component mounting pads on the upper surface of said silicon substrate;

forming a cavity in the upper surface of said silicon substrate;

movably positioning and electrically coupling a light source to a mounting pad on said silicon substrate;

aligning the light source to provide optical coupling with said light source port;

immovably affixing the light source to said silicon substrate;

affixing a thermistor to a mounting pad on said silicon substrate adjacent the light source and electrically coupling said thermistor to selected wire bond pads;

affixing and electrically and thermally coupling a heatpipe to both the light source and to a heatpipe mounting pad on said silicon substrate;

affixing a preamplifier subassembly to a mounting pad on said silicon substrate and electrically coupling said preamplifier subassembly to selected wire bond pads;

providing a mechanically and electrically coupled detector and handle subassembly;

movably positioning the handle of said detector and handle subassembly on said silicon substrate to dispose the detector in said cavity formed in said silicon substrate;

positioning said detector and handle subassembly to align the detector to receive light emitted from said detector port;

immovably affixing the aligned detector and handle subassembly to said silicon substrate;

electrically coupling said detector and handle subassembly with said preamplifier;

aligning an optical polarization maintaining output fiber to provide optical coupling with said output port;

rotationally aligning said output fiber with the polarization at said output port of the Y branch waveguide;

immovably affixing the aligned optically coupled output fiber to said silicon substrate;

mechanically and thermally coupling a thermoelectric cooler unit to the lower surface of said silicon substrate;

electrically coupling each of the thermoelectric cooler unit and the wire bond pads of each of said preamplifier, light source, thermistor, and heatpipe to selected electrical connectors to provide for data transmission and electrical power.

3. The interferometric fiber optic transceiver fabricated by the method of claim 1 or claim 2.

4. The method of claim 1 or claim 2 wherein:

$ne_L > ne_C > ne_U$; and, $no_L < no_C > no_U$.

5. The method of claim 1 or claim 2 wherein:

$ne_L < ne_C > ne_U$; and, $no_L > no_C < no_U$.

6. The method of claim 1 or claim 2 wherein:
$ne_L=no_L<ne_C=no_C>ne_U=no_U$.

7. The method of claim 2 wherein:
said cavity is formed by inductively coupled deep reactive ion etching.

8. The method of claim 1 or claim 2 wherein:
said first polymeric layer is about 2.5 µm to about 3.5 µm thick;
said second polymeric layer is an amorphous polymer about 3.0 µm thick; and,
said third polymeric layer is about 2.5 µm to about 3.5 µm thick.

9. The method of claim 1 or claim 2 wherein:
said light source is a super luminescent diode.

10. The method of claim 1 or claim 2 further including:
optimizing the heatpipe for conduction of heat from said light source into said silicon substrate.

11. The method of claim 1 or claim 2 wherein:
uncured conductive epoxy is applied to a light source mounting pad formed on the silicon substrate;
a light source is positioned on the silicon substrate in contact with said uncured conductive epoxy at a predetermined initial alignment to provide optical coupling into the waveguide light source port;
an electrical potential difference is applied between said light source and the silicon substrate to complete an electrical circuit thereby powering said light source;
the intensity of light from the light source coupled into the waveguide light source port emitted at the waveguide exit port is monitored;
the alignment of said light source is adjusted until maximum intensity of light emitted at the waveguide exit port is obtained;
the alignment of said light source providing maximum intensity of light emitted at the waveguide exit port is maintained and the conductive epoxy is cured to affix said light source to the silicon substrate.

12. The method of claim 11 wherein:
said light source is a super luminescent diode with its anode side in contact with said silicon substrate.

13. An interferometric fiber optic transceiver comprising:
a silicon substrate formed from a silicon wafer having an upper surface and an opposite lower surface;
a first polymeric layer having an ordinary index of refraction $no_L$ and an extraordinary index of refraction $ne_L$ deposited on said upper surface of the silicon substrate;
a second polymeric layer having an ordinary index of refraction $no_C$ and an extraordinary index of refraction $ne_C$ deposited on said first polymeric layer;
a waveguide having a light source port, a detector port, and an output port formed in said second polymeric layer;
a third polymeric layer having an ordinary index of refraction $no_U$ and an extraordinary index of refraction $ne_U$ deposited on said second polymeric layer;
a light source optically coupled with said light source port affixed to said silicon substrate and electrically coupled to a heatpipe and to at least one conductor adapted to connect to a source of electrical power;
a thermistor affixed to said silicon substrate and electrically coupled to at least one conductor adapted to provide data transmission and to at least one conductor adapted to connect to a source of electrical power;
said heatpipe affixed and thermally coupled to said light source and to said silicon substrate and electrically coupled to said light source and to at least one conductor adapted to connect to a source of electrical power;
a cavity formed in the upper surface of said silicon substrate adapted to receive a detector;
a detector optically coupled with said detector port fixedly disposed in said cavity;
a preamplifier affixed to said silicon substrate and electrically coupled to said detector and to at least one conductor adapted to provide data transmission and to at least one conductor adapted to connect to a source of electrical power;
an optical polarization maintaining output fiber optically coupled with said output port affixed to said silicon substrate;
said output fiber in optical communication with said detector and with said light source via said waveguide.

14. The interferometric fiber optic transceiver of claim 13 wherein:
a thermoelectric cooler unit is mechanically and thermally coupled to the lower surface of said silicon substrate.

15. The interferometric fiber optic transceiver of claim 13 wherein:
said first polymeric layer is about 2.5 µm to about 3.5 µm thick;
said second polymeric layer is an amorphous polymer about 3.0 µm thick; and,
said third polymeric layer is about 2.5 µm to about 3.5 µm thick.

16. The interferometric fiber optic transceiver of claim 13 wherein:
$ne_L>ne_C>ne_U$; and,
$no_L<no_C>no_U$.

17. The interferometric fiber optic transceiver of claim 13 wherein:
$ne_L<ne_C>ne_U$; and,
$no_L>no_C<no_U$.

18. The interferometric fiber optic transceiver of claim 13 wherein:
$ne_L=no_L<ne_C=no_C>ne_U=no_U$.

19. The interferometric fiber optic transceiver of claim 13 wherein:
said waveguide has cross-sectional geometry optimized for guiding light having a 1310 nm wavelength defined by a waveguide height of about 1.25 µm, a width at the top of said waveguide of about 4.0 µm, and width of about 7.0 µm at the bottom of said waveguide near its interface with said second polymeric layer.

20. The interferometric fiber optic transceiver of claim 13 wherein:
said waveguide has cross-sectional geometry optimized for guiding light having a 1550 nm wavelength defined by a waveguide height of about 1.50 µm, a width at the top of said waveguide of about 4.5 µm, and width of about 7.5 µm at the bottom of said waveguide near its interface with said second polymeric layer.

21. The interferometric fiber optic transceiver of claim 13 wherein:
the polarization of the optical polarization maintaining output fiber is aligned with the waveguide polarization at said output port to maximize light transmission between the waveguide and the output fiber.

22. The interferometric fiber optic transceiver of claim 13 wherein:
the heatpipe is optimized for conduction of heat from said light source into said silicon substrate.

* * * * *